United States Patent
Hannen-Williams (10) Patent No.: US 10,552,602 B2
(45) Date of Patent: Feb. 4, 2020

(54) SYSTEM AND METHOD FOR PROTECTING A DEVICE AGAINST ATTACKS ON PROCESSING FLOW USING A CODE POINTER COMPLEMENT

(71) Applicant: GEMALTO SA, Meudon (FR)

(72) Inventor: Lance Hannen-Williams, Meudon (FR)

(73) Assignee: Thales Dis France SA, Meudon (FR)

( * ) Notice: Subject to any disclaimer, the term of this patent is extended or adjusted under 35 U.S.C. 154(b) by 126 days.

(21) Appl. No.: 15/507,800

(22) PCT Filed: Aug. 31, 2015

(86) PCT No.: PCT/EP2015/069852
§ 371 (c)(1),
(2) Date: Mar. 1, 2017

(87) PCT Pub. No.: WO2016/034537
PCT Pub. Date: Mar. 10, 2016

(65) Prior Publication Data
US 2017/0242999 A1    Aug. 24, 2017

(30) Foreign Application Priority Data
Sep. 2, 2014 (EP) .................................... 14306351

(51) Int. Cl.
| | | |
|---|---|---|
| *G06F 21/52* | (2013.01) | |
| *G06F 21/57* | (2013.01) | |
| *G06F 21/56* | (2013.01) | |
| *G06F 21/55* | (2013.01) | |

(52) U.S. Cl.
CPC .............. *G06F 21/52* (2013.01); *G06F 21/55* (2013.01); *G06F 21/566* (2013.01); *G06F 21/57* (2013.01); *G06F 21/577* (2013.01); *G06F 2221/033* (2013.01)

(58) Field of Classification Search
CPC ........ G06F 21/577; G06F 21/52; G06F 21/55; G06F 21/57; G06F 21/566
See application file for complete search history.

(56) References Cited

U.S. PATENT DOCUMENTS

| | | | | | |
|---|---|---|---|---|---|
| 5,845,331 | A | * | 12/1998 | Carter ................. | G06F 12/0292 711/163 |
| 5,870,762 | A | * | 2/1999 | Lee .................... | G06F 17/30067 |
| 5,930,509 | A | * | 7/1999 | Yates ................... | G06F 9/4552 717/146 |

(Continued)

OTHER PUBLICATIONS

Fujieda, Naoki, Kiyohiro Sato, and Shuichi Ichikawa. "A Complement to Enhanced Instruction Register File against Embedded Software Falsification." Proceedings of the 5th Program Protection and Reverse Engineering Workshop. Acm, 2015. (Year: 2015).*

(Continued)

*Primary Examiner* — Kari L Schmidt
(74) *Attorney, Agent, or Firm* — The Jansson Firm; Pehr B. Jansson (57) ABSTRACT

A system, method and computer-readable storage medium with instructions for operating a processor of an electronic device to protect against unauthorized manipulation of the code pointer by maintaining and updating a code pointer complement against which the code pointer may be verified. Other systems and methods are disclosed.

6 Claims, 5 Drawing Sheets

(56) References Cited

U.S. PATENT DOCUMENTS

| | | | | |
|---|---|---|---|---|
| 6,003,123 | A * | 12/1999 | Carter | G06F 12/0292 711/207 |
| 7,080,249 | B1 * | 7/2006 | Jakubowski | G06F 21/125 713/165 |
| 7,152,193 | B2 * | 12/2006 | Watkins | G06F 21/52 714/724 |
| 7,647,495 | B2 * | 1/2010 | Ness | G06F 12/1416 713/164 |
| 8,108,856 | B2 * | 1/2012 | Sahita | G06F 9/45533 718/1 |
| 9,600,289 | B2 * | 3/2017 | Meier | G06F 9/3834 |
| 2004/0034823 | A1 | 2/2004 | Watkins et al. | |
| 2004/0210737 | A1 | 10/2004 | Ness | |
| 2009/0282393 | A1 * | 11/2009 | Costa | G06F 21/52 717/132 |
| 2013/0007073 | A1 * | 1/2013 | Varma | G06F 12/0253 707/813 |
| 2013/0205403 | A1 * | 8/2013 | Grocutt | G06F 21/52 726/27 |
| 2013/0326198 | A1 | 12/2013 | Meier et al. | |
| 2015/0302195 | A1 * | 10/2015 | Acar | G06F 21/54 726/23 |
| 2016/0381050 | A1 * | 12/2016 | Shanbhogue | G06F 9/30145 726/23 |
| 2017/0017791 | A1 * | 1/2017 | Brandt | G06F 21/52 |
| 2017/0083291 | A1 * | 3/2017 | Shieh | G06F 9/45558 |

OTHER PUBLICATIONS

X. Zhai et al., "A Method for Detecting Abnormal Program Behavior on Embedded Devices," in IEEE Transactions on Information Forensics and Security, vol. 10, No. 8, pp. 1692-1704, Aug. 2015. (Year: 2015).*

PCT/EP2015/069852 International Search Report, dated Oct. 28, 2015, European Patent Office, P.B. 5818 Patentlaan 2 NL-2280 HV Rijswijk.

PCT/EP2015/069852 Written Opinion of the International Searching Authority, dated Oct. 28, 2015, European Patent Office, D-80298 Munich.

* cited by examiner

SYSTEM AND METHOD FOR PROTECTING A DEVICE AGAINST ATTACKS ON PROCESSING FLOW USING A CODE POINTER COMPLEMENT

BACKGROUND OF THE INVENTION

The present invention relates generally to protecting electronic devices against attacks designed to disrupt the processing flow of programs executing on the electronic devices by manipulating the code pointer, and in particular, to protecting an electronic device from attacks on processing flow by updating a code pointer complement in parallel with updating the code pointer.

Both electronic communication and digital commerce can be powerful yet dangerous tools. With the widespread availability of network technology, such as the Internet, there is an ever-increasing use of and dependence upon online tools for communication and commerce. Each year more users find it easier or quicker to conduct important transactions using computers and other computerized devices over computer networks. However, there is always the risk that the security of electronic transactions can be compromised through interception by third parties who do not have the right to partake in the transactions. When malicious third parties obtain access to otherwise private transactions and data there is risk of economic loss, privacy loss, and jeopardized physical safety.

One type of attack against the sensitive information that is stored in security devices is the Buffer Overflow Attack. Buffer overflow is an attack model that is based on stack allocation. Buffer overflows occur when data is written outside of the allocated space for a particular data structure. If the operating system does not guard against such out-of-bounds writing of data, an attacker may write into space that is intended as the return address for procedure calls. By doing so, the attacker may redirect the return to a malicious code, which would run with the same permissions and privileges as the targeted code. Thus, the malicious code may perform any function that can otherwise be programmed. One mechanism would be to open a remote shell on the compromised machine. In that case, the injected malicious code is referred to as shellcode.

Attacks against processing flow are also often used to circumvent certain critical portions of programs. For example, many programs include code that verifies that a user has been authorized to execute the program. By circumventing the processing flow to bypass such verification code, a malicious user may use the program without the requisite credential allowing legitimate use thereof.

On an embedded operating system—for example, IOS from Apple Inc., Cupertino, Calif., USA—some protections like address-space layout randomization (ASLR) or using page code that is not writable prevent attackers from tampering with applications to run malicious code. However, such techniques may be circumvented by an attacker by tracking the existing application code using a debugger that causes the application to execute in an alternate order specified by the attacker.

Another defence against processing-flow attacks include embedding security countermeasures directly in the programs. These countermeasures use specific and often complex techniques in an attempt to verify that critical sections of code have been executed and where possible that the order of execution is correct. This type of secure programming requires a specialized area of knowledge as the developer must understand both the types of attacks that can be performed as well as efficient methods of protection against those attacks. Thus, there are at least two problems associated with that solution: (1) it requires modification of individual programs and places the burden of implementing the countermeasures on the application developer, and (2) it adds significant overhead cost in development time and personnel needs. Furthermore, in most cases there is no guarantee that these countermeasures fully protect against skipped code or other processing flow modifications.

From the foregoing it will be apparent that there is still a need for an improved technology to provide a secure mechanism that is computationally efficient, that does not require excessively large registers or other storage, and in which enables a portable security device to have the capability of protecting against attacks on processing flow such as buffer overflow, stack overflow, shellcode attacks and other code pointer manipulations.

DETAILED DESCRIPTION OF THE INVENTION

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

In an embodiment of the invention, a technology is provided that enables electronic devices, such as smart cards and mobile telephones, to be used to protect a code pointer against attacks that alter processing flow. The technology allows for such protection without modification to application programs.

Figure 1:
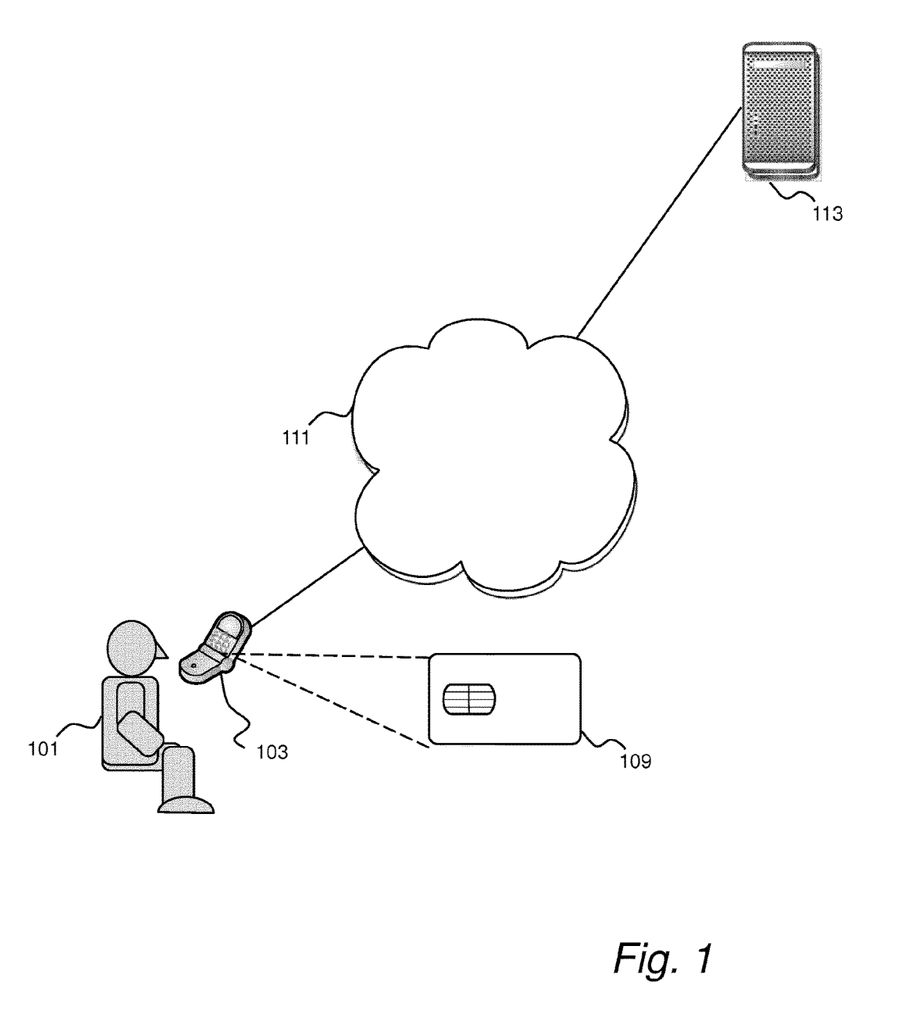
FIG. 1 is a schematic illustration of a telephony network in which a mobile electronic device is connected to other mobile electronic devices and to data servers.

FIG. 1 is a schematic illustration of a network 111 connecting a mobile device 103 with a portable security device 109, e.g., a smart card, connected thereto, to one or more remote servers 113. For illustrative purposes, we describe the technology presented herein as it may be used in a portable security device 109. However, the technology presented is applicable to any programmable electronic device subject to attacks against flow-of-control associated with procedure calls.

The mobile device 103 is operated by a user 101 who may interact with one of the servers 113 over the network. Certain critical operations, e.g., cryptographic and authentication operations may be deferred by the mobile device 103 to the security device 109.

Figure 2:
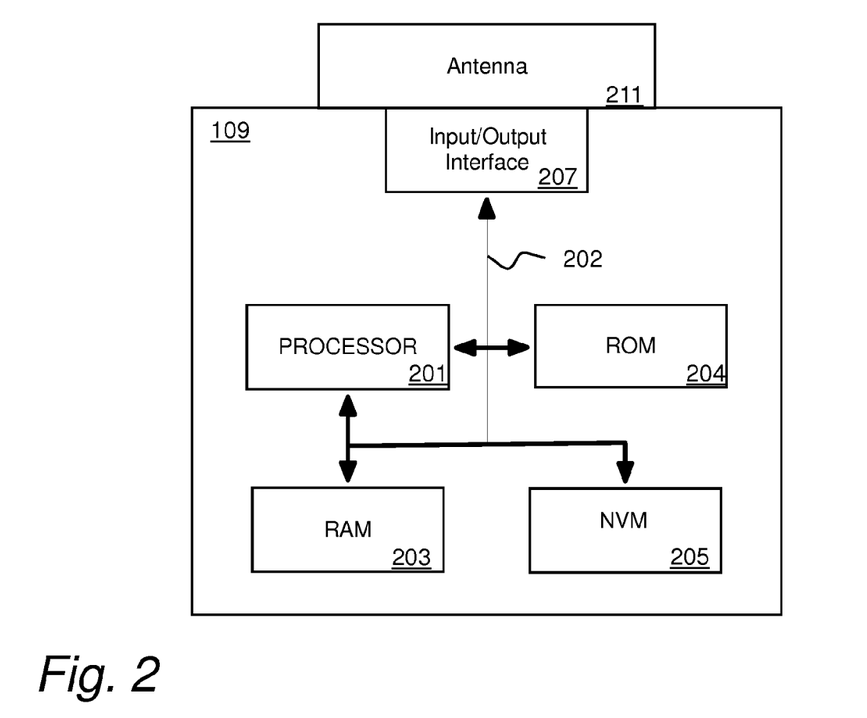
FIG. 2 is a schematic illustration of a high-level architecture of a mobile electronic device.

FIG. 2 is a schematic illustration of a security device 109. The security device 109 may include a processor 201 connected via a bus 202 to a random access memory (RAM) 203, a read-only memory (ROM) 204, and a non-volatile memory (NVM) 205. The security device 109 further includes an input/output interface 207 for connecting the processor 201, again typically via the bus 202, to a connector 211 by which the security device 109 may be connected to a host computer or peripheral devices.

Figure 3:
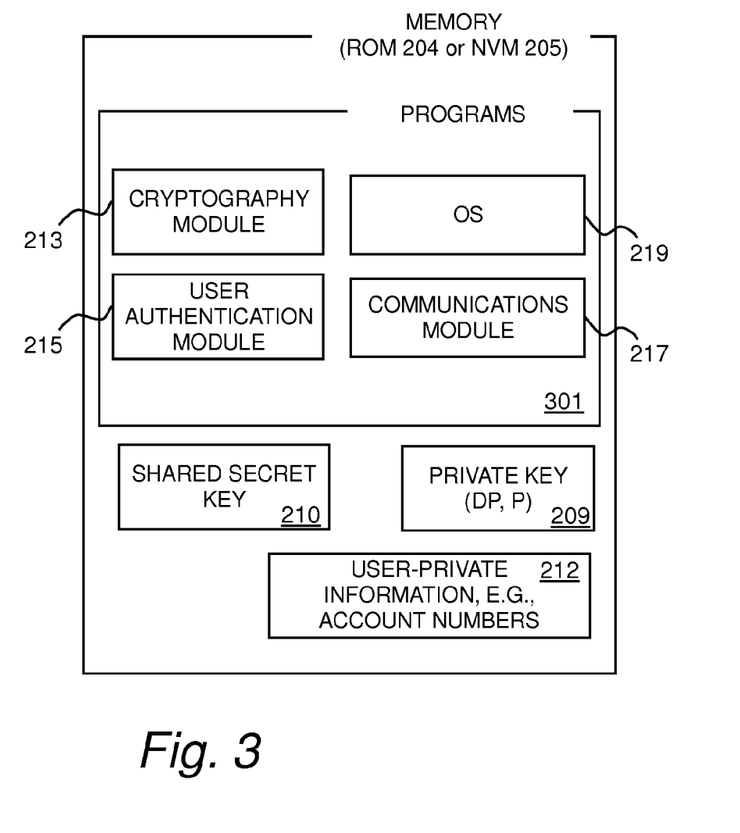
FIG. 3 is a schematic illustration of programs stored in a memory of the mobile electronic device of FIG. 2.

The ROM 204 and/or NVM 205 may include computer programs 301 as is illustrated in FIG. 3. While it is here depicted that the computer programs 301 are all co-located in the ROM 204 or the NVM 205, in actual practice there is no such restriction as programs may be spread out over multiple memories and even temporarily installed in RAM 203. Furthermore, the security device 109 may include multiple ROMs or NVMs. The programs 301 include operating system programs as well as application programs loaded on to the security device 109. The NVM 205 or ROM 204 may also contain private data, such as a private key 209 or a shared secret key 210, stored either in its basic form or in derived quantities, as well as other user-private information 212 such as account numbers.

The security device 109 programs 301 may include a cryptography module 213, a user authentication module 215, a communications module 217, and the operating system OS 219.

Figure 4:
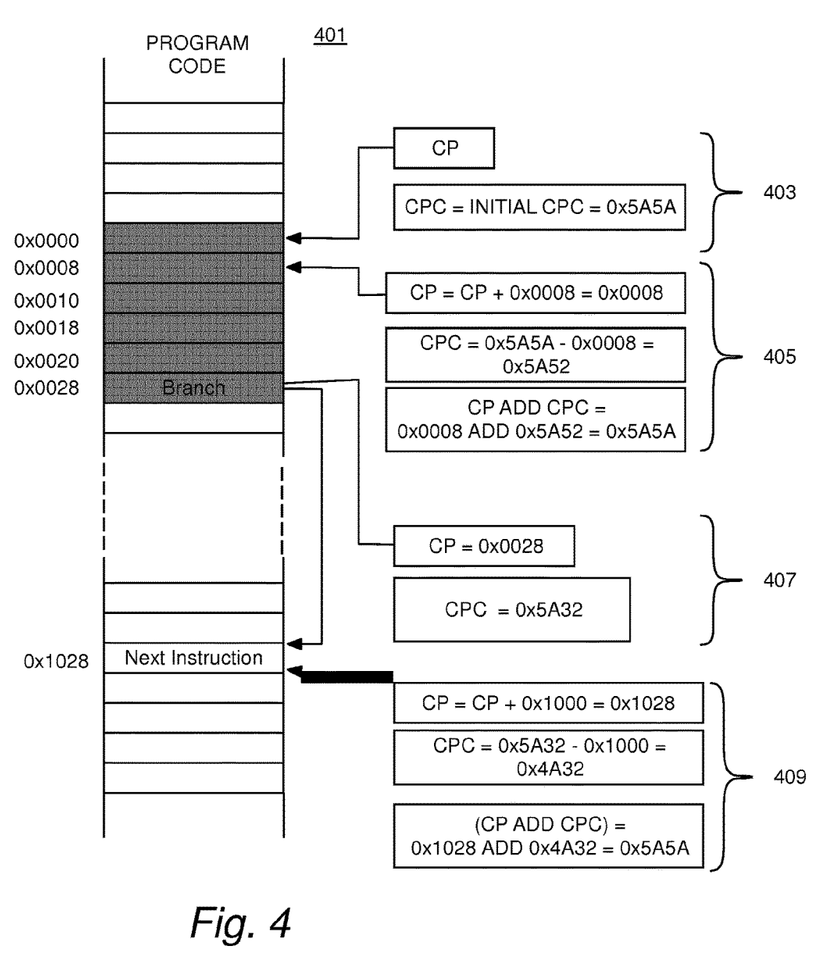
FIG. 4 is a schematic illustration of a section of program code and associated updates to the code pointer and a code pointer complement according to the invention.

FIG. 4 is an illustration of an example of a section of program code 401 which may be processed according to the invention. The program 401 includes a number of sequential instructions beginning at memory location 0x0000 followed by a branch at instruction 0x0028 to another section of code beginning at memory location 0x1028. When the processor 201 executes the code section, a code pointer (CP) points to the next instruction to be executed by the processor 201. At the outset, illustrated by reference numeral 403, the CP has the value 0x0000 indicating that the processor is to next execute the instruction at 0x0000.

Figure 5:
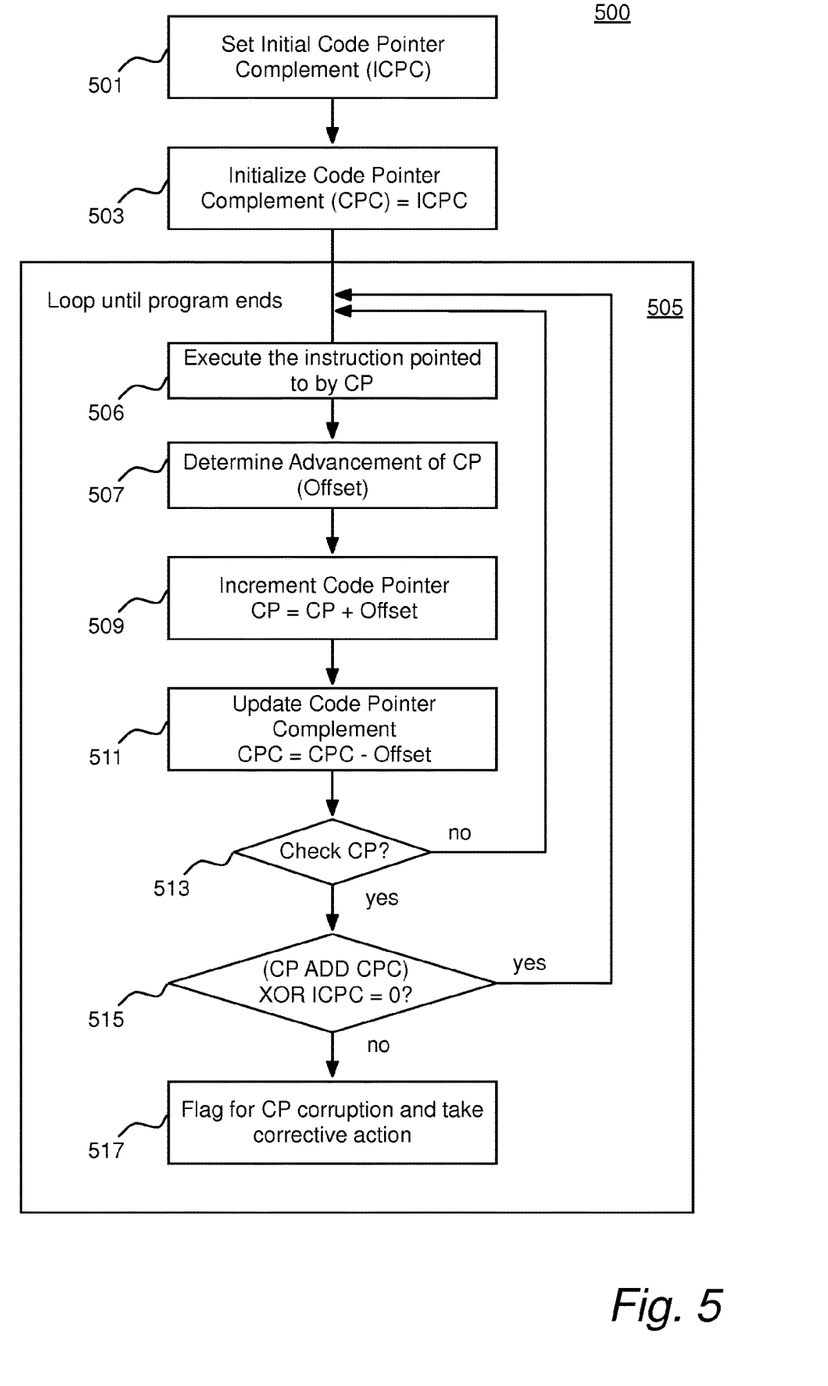
FIG. 5 is a flow-chart illustrating the steps of computing a code pointer complement and using the code pointer complement to verify a code pointer during the execution of a program.

According to an embodiment of the technology presented herein, the processor 201 also maintains a code processor complement (CPC). FIG. 5 is a flow-chart illustrating the updating and verification of the CP and CPC.

The CPC is given an initial value (Initial CPC or ICPC). Thus, first the ICPC is given a value, step 501. This value may be predetermined or dynamically assigned, for example, upon the loading of an application for execution. The ICPC may be given a value that has an irregular or unpredictable bit pattern, e.g., 0x5A5A as in the example of FIG. 4. Irregular or unpredictable bit pattern is intended to mean a sequence of bits that do not have a distinct pattern. While such an irregular bit pattern ICPC may be desirable to avoid attacks against the present mechanism, the mechanism operates with any ICPC value.

The CPC is initially set to the ICPC, step 503.

Loop 505 illustrates how the processor executes instructions to implement the present technology. Thus, it is an illustration not of the flow of an application program but how the operating system or virtual machine executes instructions. The loop 505 loops over the instructions of the program following the process flow dictated by the program being executed or interpreted by the processor 201 until the program ends.

For each iteration of the loop 505, the instruction pointed to by the code pointer (CP) is executed, step 506.

Next the CP is advanced by an increment, an offset, or to a new location determined from the type of instruction, step 507. For example, for a non-branching instruction, the next instruction is the next instruction in a sequence and the increment to CP is simply the length of an instruction. This is illustrated in FIG. 4 at reference numeral 405. There, in the illustrated example, an instruction is 8 bytes long, so the next instruction is 0x0008. For a branching instruction, the next instruction may be specified as an offset from the current instruction or by a specific address that would cause an increment (or decrement) of the code pointer by a particular amount. The branch situation is illustrated in FIG. 4 at reference numerals 407 and 409. At 407 the CP is 0x0028 and the CPC is 0x5A32. The branch at that location causes an increment of CP by 0x1000 to 0x1028.

Returning to FIG. 5, code pointer (CP) is incremented by the determined offset from the current CP, step 509, which is simply adding the offset to CP:

CP=CP+Offset

Thus, for example, from instruction 0x0000 to instruction 0x0008 the CP is advanced to 0x0008 and from instruction 0x0028 to instruction 0x1028, the offset being 0x1000, the CP is advanced to 0x1028.

Next (or in parallel to Step 509) the code pointer complement (CPC) is updated by the same offset by an opposite instruction, step 511, e.g.:

CPC=CPC−Offset

Thus, continuing with the example of FIG. 4, at 0x0008 (reference numeral 405), the CPC is calculated from the previous CPC (0x5A5A) to 0x5A52:

CPC=0x5A5A−0x0008=0x5A52

At the branch instruction at 0x0028, the CPC, after a sequence of advancements of the CP and CPC, is 0x5A32 (reference numeral 407. Then with the branch offset being 0x1000, the new CPC is calculated to be 0x4A32 (reference numeral 409):

CPC=0x5A32−0x1000=0x4A32

The CP and CPC should be updated using different operations so that an attack against one of the operations does not effect the other; an attacker would have to provide offsetting attacks to foil the attack defense described herein.

At various points during the execution or interpretation of a program, the code pointer may be verified against the code pointer complement. Whether to check the CP is depicted in FIG. 5 by decision box 513. There are many different criteria that can be used to decide whether the CP should be checked, for example:

In the extreme, every instruction could be followed by the verification of the CP The CP could be checked periodically, e.g., after every n instructions or after a specified time increment The CP could be checked after certain instructions, e.g., upon making or returning from a procedure call Randomly By embedding special instructions in the program The verification is performed by adding the CP to the CPC and comparing the result against the initial CPC (ICPC) by XORing the two, step 515:

(CP ADD CPC) XOR ICPC

If the verification results in zero, i.e., if the condition (CP ADD CPC) XOR ICPC=0 is true, the CP has been verified as not having been manipulated because the CPC is a correct complement of the CPC. In that case, execution or interpretation may continue.

Otherwise, step 517, a flag is raised that the CP has been corrupted or some corrective action could be taken. Corrective actions may include, for example:

Alerting the user that the secure device 109 may have been subject to some form of attack Alerting the issuer of the secure device 109 that the device may have been subject to an attack Disabling the secure device 109

Immediately halting the operation with the secure device 109

A combination of the above corrective actions

An advantage of the technology described hereinabove in conjunction with FIGS. 4 and 5 is that the technology may be used in applications where a corrupted code pointer can produce safety hazards regardless of whether the code pointer was deliberately manipulated or corrupted through some technical problem. For example, an electrical power glitch may cause a register value to change. If that register is the code pointer register, a program would likely execute incorrectly. In safety-critical applications such as those used in the medical, aeronautical, industrial automation, and military fields, the problems created by incorrect program flow could be dangerously magnified. Thus, in step 517, i.e., when code pointer corruption has been detected, the corrective action may be to reset the executing program to a known safe point and provide some warning messages, signal a fault, log the corruption event, and/or freeze further execution.

The technology for protecting a processor against attacks which manipulate the code pointer may be implemented in software or firmware instructions, for example, in a virtual machine interpreting programs for the security device or in the operating system of the security device. The instructions may be stored in the NVM 205 or in the ROM 204. Alternatively, the verification of the CPC may be implemented in hardware, for example, by being built into the processor 201 as a combination of XOR and AND gates.

Hereinabove a technology is described that protects a programmable device, e.g., a security device such as a smart card, from manipulation of a code pointer. Thus, the technique provides an anti-tampering method that prevents attacks that alter program control flow.

Although specific embodiments of the invention have been described and illustrated, the invention is not to be limited to the specific forms or arrangements of parts so described and illustrated. The invention is limited only by the claims.

The invention claimed is:

1. A method for operating a processor to protect the processor from attacks targeting a software code pointer of the processor, comprising:

setting a fixed initial value of a software code pointer complement;

setting the software code pointer complement to the fixed initial value of the software code pointer complement;

executing an instruction pointed to by the software code pointer;

updating the software code pointer by adding an offset such that the updated software code pointer points to a next instruction to be executed by the processor;

updating the software code pointer complement by subtracting the offset added to the software code pointer from the software code pointer complement;

performing a verification calculation using a function that accepts both the software code pointer and the software code pointer complement to produce a verification result indicative of a correct update of the software code pointer wherein the performing of a verification calculation comprises adding the software code pointer complement and software code pointer and verifying that the result corresponds to the fixed initial value of the software code pointer complement; and taking a corrective action if the verification calculation is indicative of a manipulation of the software code pointer.

2. The method for operating a processor to protect the processor from attacks targeting a software code pointer of the processor of claim 1 wherein the corrective action includes taking one or more actions selected from the set including alerting of a potential attack, disabling the processor, halting operation of the processor, and resetting the code pointer to a safe location.

3. The method of claim 1, further comprising setting the code pointer complement to a value with an irregular bit pattern.

4. The method of claim 1, wherein the code pointer is updated using a first operation and the code pointer complement is updated using a second operation distinct from the first operation.

5. An electronic device having a processor and memory containing program instructions, the electronic device having a mechanism for protecting the electronic device against attacks targeting a software code pointer maintained by the electronic device, comprising:

the processor of the electronic device programmed by instructions stored in the memory of the electronic device to cause the processor to:

set a fixed initial value of a software code pointer complement;

set the software code pointer complement to the fixed initial value of the software code pointer complement;

execute an instruction pointed to by the software code pointer;

update the software code pointer by adding an offset such that the updated software code pointer points to a next instruction to be executed by the processor;

update the software code pointer complement by subtracting the offset added to the software code pointer from the software code pointer complement;

perform a verification calculation using a function that accepts both the software code pointer and the software code pointer complement to produce a verification result indicative of a correct update of the software code pointer wherein the processor performs a verification calculation comprises taking an exclusive-OR of the software code pointer complement and software code pointer and verifying that the result corresponds to the fixed initial value of the software code pointer complement; and take a corrective action if the verification calculation indicates manipulation of the software code pointer.

6. The electronic device with a mechanism for protecting the electronic device against attacks targeting a software code pointer maintained by the electronic device according to claim 5 wherein the corrective action includes taking one or more actions selected from the set including alerting of a potential attack, disabling the processor, halting operation of the processor, and resetting the code pointer to a safe location.

* * * * *